United States Patent
Jayaram

(10) Patent No.: US 9,532,188 B1
(45) Date of Patent: Dec. 27, 2016

(54) CREATING A GROUP BASED ON PROXIMATE DETECTION

(71) Applicant: Google Inc., Mountain View, CA (US)

(72) Inventor: Ranjith Jayaram, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/806,378

(22) Filed: Jul. 22, 2015

Related U.S. Application Data

(60) Provisional application No. 62/035,475, filed on Aug. 10, 2014.

(51) Int. Cl.
| | |
|---|---|
| *H04W 4/08* | (2009.01) |
| *H04W 4/00* | (2009.01) |
| *H04W 4/20* | (2009.01) |
| *H04L 29/12* | (2006.01) |

(52) U.S. Cl.
CPC ............ *H04W 4/08* (2013.01); *H04L 61/2069* (2013.01); *H04W 4/008* (2013.01); *H04W 4/206* (2013.01)

(58) Field of Classification Search
CPC ........ H04W 4/08; H04W 4/206; H04W 4/008; H04W 8/186; H04L 61/2069; H04L 12/588; H04L 51/32; H04B 5/0031
See application file for complete search history.

(56) References Cited

U.S. PATENT DOCUMENTS

| | | | | |
|---|---|---|---|---|
| 8,463,295 | B1* | 6/2013 | Caralis ............... | G06Q 30/0631 455/414.2 |
| 2011/0142016 | A1* | 6/2011 | Chatterjee .............. | G06Q 30/02 370/338 |
| 2014/0188990 | A1* | 7/2014 | Fulks ................... | H04L 65/403 709/204 |
| 2014/0250174 | A1* | 9/2014 | Zamer ..................... | H04L 67/22 709/204 |
| 2014/0282967 | A1* | 9/2014 | Maguire ............... | H04W 36/18 726/7 |
| 2014/0304343 | A1* | 10/2014 | Skiba .................. | H04M 3/5175 709/206 |
| 2014/0310349 | A1* | 10/2014 | Rainisto ................. | G06Q 50/01 709/204 |
| 2015/0058239 | A1* | 2/2015 | Lenahan ............ | G06Q 30/0631 705/319 |

(Continued)

*Primary Examiner* — Andrew Wendell
(74) *Attorney, Agent, or Firm* — Patent Law Works LLP

(57) ABSTRACT

A system and method for creating a group based on proximate detection are disclosed. In one implementation, the system includes a current device, a subsequent device, a completion determination module and a group creation module. The current device detects a subsequent device via a proximity detection technique and sends group data including a current user identifier to the subsequent device. The subsequent device receives the group data and, responsive to receiving the group data, modifies the group data to include a subsequent user identifier. The completion determination module determines that a completion pattern exists when the completion determination module determines that the subsequent user is a group creator. The group creation module creates an online, social networking group, responsive to the existence of the completion pattern. The group includes a plurality of users associated with a plurality of user identifiers of the group data.

20 Claims, 6 Drawing Sheets

(56) References Cited

U.S. PATENT DOCUMENTS

| | | | | |
|---|---|---|---|---|
| 2015/0127728 A1* | 5/2015 | Marti | ...................... | H04L 51/32 |
| | | | | 709/204 |
| 2015/0381553 A1* | 12/2015 | Rajakarunanayake | . | H04L 51/32 |
| | | | | 709/204 |
| 2016/0014677 A1* | 1/2016 | Chen | ..................... | H04W 48/16 |
| | | | | 455/434 |

* cited by examiner

CREATING A GROUP BASED ON PROXIMATE DETECTION

CROSS-REFERENCE TO RELATED APPLICATIONS

This application claims the benefit under 35 U.S.C. §119 (e) of U.S. Patent Application No. 62/035,475, entitled "Form a Circle to Form a Circle" filed Aug. 10, 2014, the contents of which are all incorporated by reference herein.

BACKGROUND

The specification relates to online social networks. In particular, the specification relates to creating a group based on proximate detection.

Some online, social networks allow the creation of groups. For example, a user may create a group for the user's work colleagues and a group for his/her friends. The formation of groups may allow the user to control the information he/she shares on the social network with each group. For example, the user may share pictures of a family reunion with the user's family but not his/her work colleagues. Current systems for creating an online social networking group include manual creation and creation by location. Manual creation may require a user to individually locate and add other users to a group. This is laborious and time consuming especially if the group being created is large. Creation by location allows a user to add other users in a given location to a group. However, there will often be individuals at the location that the user does not want to include in the group. Therefore, a user must remove those individuals, which may be laborious and time consuming.

A problem is that current systems of creating groups including online, social networking groups do not use proximate detection to allow the creation of a group more rapidly than by manual creation without the over inclusion of individuals that may accompany creation by location.

SUMMARY

The specification overcomes deficiencies and limitations at least in part by providing a system and method for creating a group based on proximate detection.

According to one innovative aspect of the subject matter described in this disclosure, a current device detects a subsequent device via a proximity detection technique. The current device is associated with a current user and sends group data including a current user identifier to the subsequent device. The current user identifier is associated with the current user. The subsequent device receives the group data. The subsequent device is associated with a subsequent user, and responsive to receiving the group data, the subsequent device modifies the group data to include a subsequent user identifier. The subsequent user identifier is associated with the subsequent user. The subsequent device is communicatively coupled to the current device to receive the group data. The completion determination module determines that a completion pattern exists. The completion pattern exists when the completion determination module determines that the subsequent user is a group creator. The completion determination module is communicatively coupled to the subsequent device to receive the group data. The group creation module creates an online, social networking group, responsive to the existence of the completion pattern. The group includes a plurality of users associated with a plurality of user identifiers of the group data. The group creation module is communicatively coupled to receive the existence of a completion pattern from the completion determination module.

In general, another innovative aspect of the subject matter described in this disclosure may be embodied in methods that include detecting, by a current device, a subsequent device a via a proximity detection technique, the current device associated with a current user, the subsequent device associated with a subsequent user; sending, by the current device, group data including a current user identifier to the subsequent device, the current user identifier associated with the current user; receiving, by the subsequent device, the group data; responsive to receiving the group data, modifying, by the subsequent device, the group data to include a subsequent user identifier, the subsequent user identifier associated with the subsequent user; determining that a completion pattern exists, wherein the completion pattern exists when it is determined that the subsequent user is a group creator; and creating an online, social networking group, responsive to the existence of the completion pattern, the group including a plurality of users associated with a plurality of user identifiers of the group data.

Other aspects include corresponding methods, systems, apparatus, and computer program products. These and other implementations may each optionally include one or more of the following features. For instance, the operations further include: The group data includes an ordered list of the plurality of user identifiers, the ordered list generated by each device appending the user identifier of the user associated with that device to the list such that the user identifier associated with the group creator is at a first end of the list and the user identifier associated with the most recent recipient of the group data is at a second end of the list, and wherein determining a completion pattern exists includes determining that the user identifier at the first end of the ordered list and the second end of the ordered list are identical. Creating the group further includes sending the group data to a social networking server, the social networking server associated with an online social networking service; and creating, at the social network server, the online social networking group including the plurality of user associated with a plurality of user identifiers of the group data. The subsequent device determines whether a completion pattern exists. Creating the group modifies a pre-existing group by including the plurality of users associated with the plurality of user identifiers to the pre-existing group. The proximity detection technique includes near field communication. Sending the group data uses near field communication.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1:
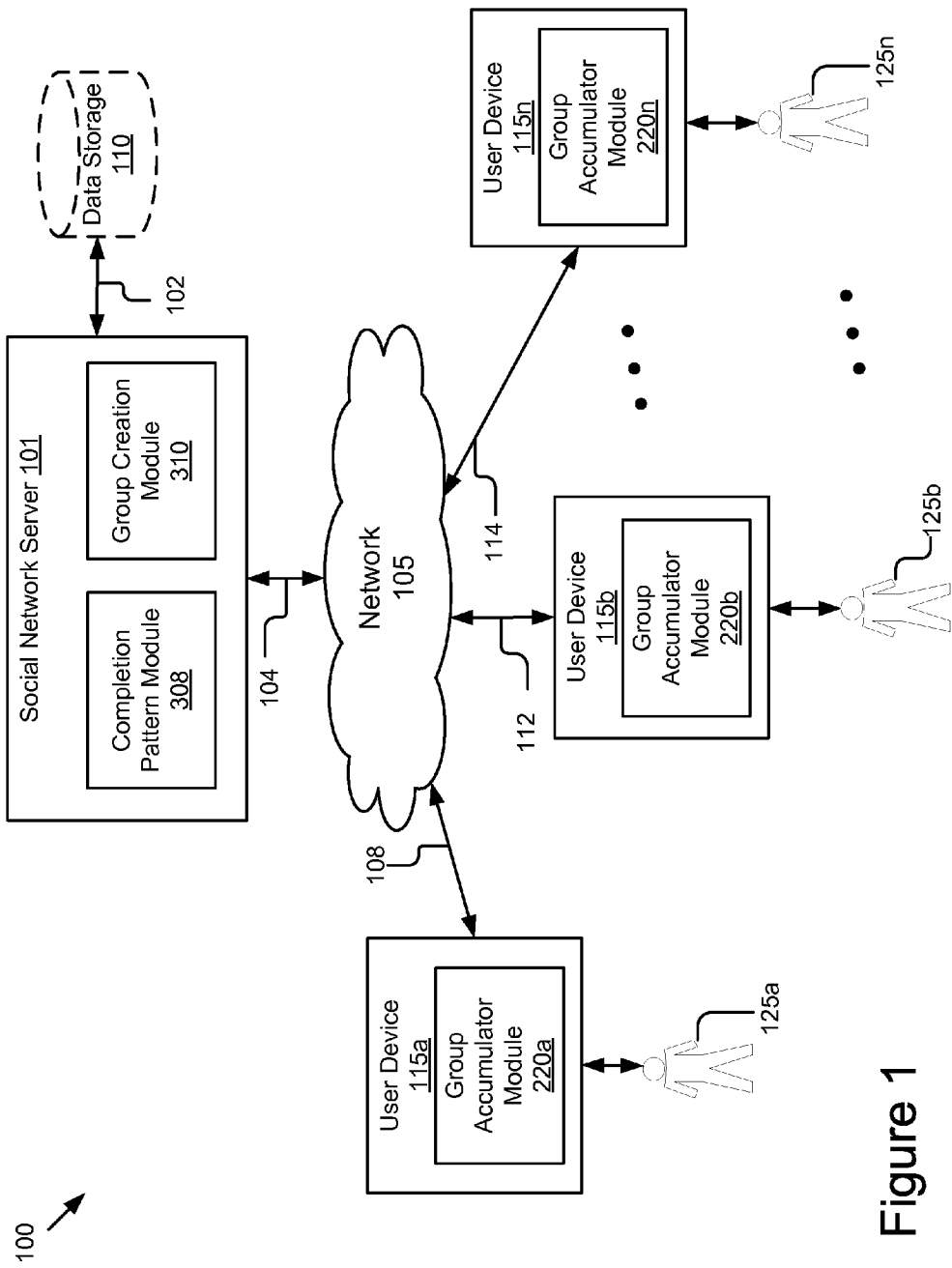
FIG. 1 illustrates an example system for creating a group based on proximate detection according to one implementation.

A system and method for creating a group based on proximate detection are described herein. For example, assume a first user device is placed proximate to a second user device, the second user device is placed proximate to a third user device and so on until the Nth user device is placed proximate to the first user device. In one implementation, the system uses near field communication (NFC) to determine proximity and to transfer group data each time two devices are proximate. In one implementation, the group data includes user identifiers associated with users of the current and any previous user identifiers. For example, in one implementation, the group data of the Nth device would include user identifiers associated the users of devices 1 through N. According to one implementation, when a completion pattern exists (e.g. the group data is transferred from the Nth device to the first device), the group data is used to create an online, social networking group. Such implementations may beneficially decrease the time and effort required of users to create groups including groups in online, social networks.

In the following description, for purposes of explanation, numerous specific details are set forth in order to provide a thorough understanding of the implementations. It will be apparent, however, that the implementations can be practiced without these specific details. In other instances, structures and devices are shown in block diagram form in order to avoid obscuring the implementations. For example, one implementation is described below with reference to user interfaces and particular hardware. However, the present implementations apply to any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementations also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The implementations can take the form of an entirely hardware implementation, an entirely software implementation or an implementation containing both hardware and software elements. An exemplary implementation is implemented in software, which includes but is not limited to firmware, resident software, microcode, etc.

Furthermore, the implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1 illustrates a block diagram of a system 100 for creating a group based on proximate detection according to one implementation. The illustrated system 100 includes user devices 115a, 115b, and 115n (also referred to collectively as user devices 115 or individually as user device 115) that are accessed by users 125a, 125b, and 125n (also referred to collectively as users 125 or individually as user 125) and a social network server 101. In the illustrated implementation, these entities are communicatively coupled via a network 105. Although only three user devices 115 are illustrated, any number of user devices 115 are available to any number of users 125.

The user devices 115 in FIG. 1 are used by way of example. While FIG. 1 illustrates three user devices 115, the present specification applies to any system architecture having two or more user devices 115. Furthermore, while only one network 105 is coupled to the user devices 115 and the social network server 101, in practice any number of networks 105 can be connected to the entities. Furthermore, while only one social network server 101 is shown, the system 100 can include any number of social network servers 101.

In one implementation, the social network server 101 includes, or is included within, a social network. A social network is any type of social structure where the users are connected by a common feature. Examples include, but are not limited to, blogs, microblogs and Internet forums. The common feature includes friendship, family, a common interest, etc.

In one implementation, each user device 115 includes a group accumulator module 220. For example, in the illustrated implementation, the group accumulator module 220a is included in user device 115a and is operable on user device 115a, which is connected to the network 105 via signal line 108. The group accumulator module 220b is included in user device 115b and is operable on user device 115b, which is connected to the network 105 via signal line 112. The group accumulator module 220n is included in user device 115n and is operable on user device 115n, which is connected to the network 105 via signal line 114.

In some implementations the group accumulator module 220 includes multiple, distributed modules that cooperate with each other to perform the functions described below. In one implementation, one or more components of the group accumulator module 220 are included in the social network server 101 and are operable on the social network server 101, which is connected to the network 105 via signal line 104. For example, as illustrated, in one implementation, the social network server 101 may include one or more of the completion pattern module 308 and the group creation module 310. Details describing the functionality and components of the group accumulator module 220 are explained in further detail below with regard to FIG. 3.

The network 105 enables communications between user devices 115 and the social network server 101. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial or satellite-based transceivers). In one implementation, the network 105 is an IP-based wide or metropolitan area network.

In some implementations, the network 105 helps to form a set of online relationships between users 125, for example, those provided by one or more social networking systems including explicitly-defined relationships and relationships implied by social connections with other online users, where the relationships form a social graph. In some examples, the social graph can reflect a mapping of these users and how they are related.

In the illustrated implementation, the user devices 115a, 115b and 115n are coupled to the network 105 via signal lines 108, 112 and 114, respectively. The user 125a can interact with the user device 115a. Similarly, the user 125b can interact with the user device 115b, and the user 125n can interact with the user device 115n. The social network server 101 is communicatively coupled to the network 105 via signal line 104.

In one implementation, the data storage 110 stores data and information for creating a group based on proximate detection. Examples of data and information for creating a group based on proximate detection include, but are not limited to, group data including user identifiers and social network profiles associated with a user identifier. In one implementation, which is discussed below, a storage device 214 (see FIG. 2) is included in a computing device 200 (e.g. a social network server 101) and the storage device 214 stores the data and information for creating a group based on proximate detection.

In one implementation, the user device 115 is an electronic device capable of interacting with the social network server 101 and other user devices 115 of the system 100. The user device 115 can be, for example, a laptop computer, a desktop computer, a tablet computer, a mobile telephone, a personal digital assistant (PDA), a mobile email device, a portable game player, a portable music player or any other electronic device capable of accessing a network. It will be recognized that other types of client devices 115 are possible. In one implementation, the system 100 includes a combination of different types of client devices 115. For example, a combination of a personal computer, a mobile phone and a tablet computer. The user 125 is a human user of the user device 115.

Figure 2:
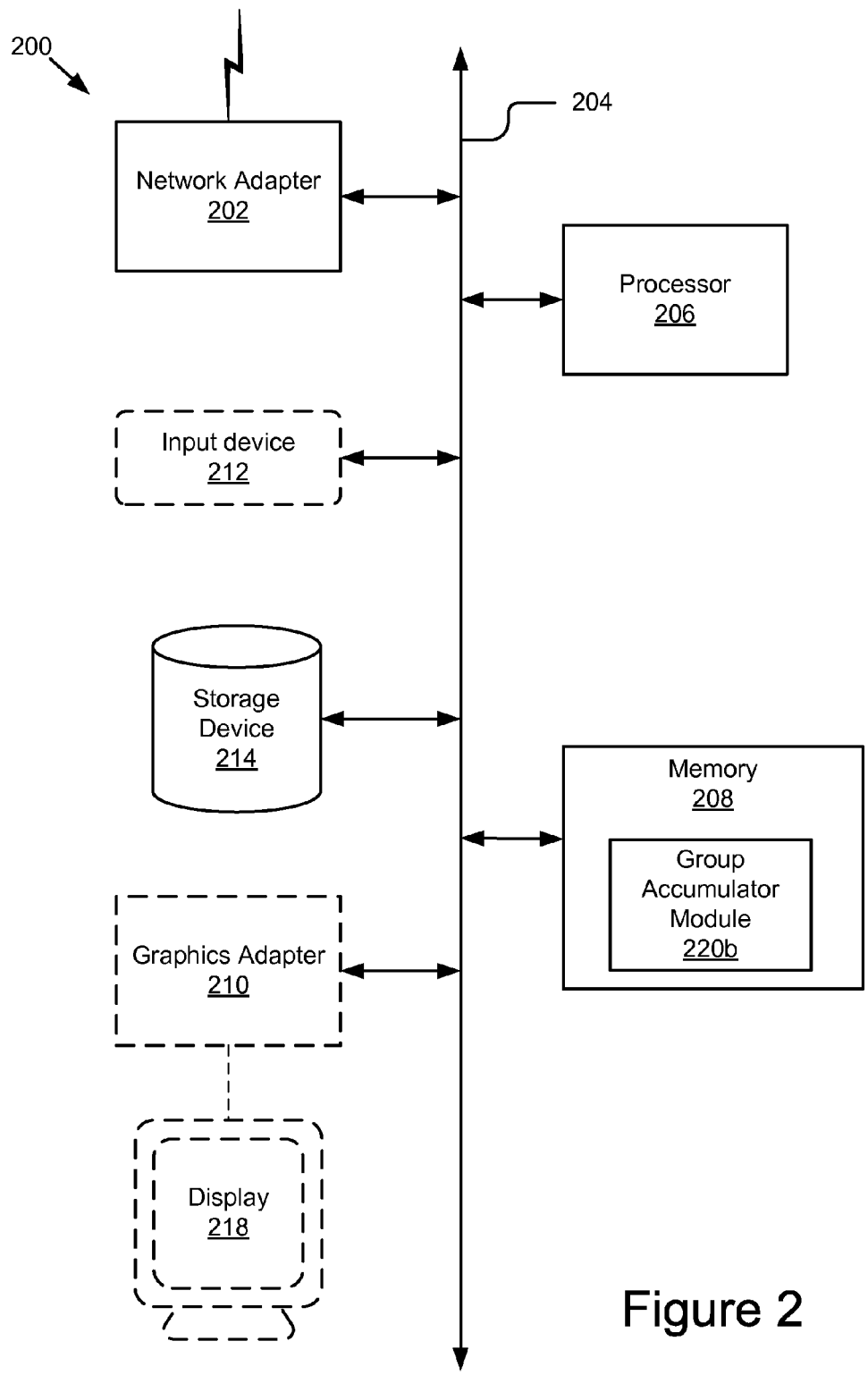
FIG. 2 is a block diagram illustrating an example computing device according to one implementation.

FIG. 2 is a block diagram of a computing device 200 according to one implementation. As illustrated in FIG. 2, the computing device 200 includes a network adapter 202, processor 206, memory 208 and a storage device 214 coupled to a bus 204. In one implementation, the computing device 200 is a user device 115, and the memory 208 includes a group accumulator module 220. In another implementation, the computing device is a social network server 101 and the memory 208 includes one or more of a social networking module 209 (not shown), a completion pattern module 308 (not shown), and a group creation module 310 (not shown). In one implementation, the functionality of the bus 204 is provided by an interconnecting chipset. According to one implementation, also coupled to the bus 204 are a graphics adapter 210, an input device 212, a graphics adapter 210 and a display 218, which is coupled to the graphics adapter 210.

The network adapter 202 sends and receives data from the various system 100 components (e.g. user devices 115, social network server 101, etc.). The network adapter 202 sends received data to the group accumulator module 220. The network adapter 202 is coupled to the bus 220. In one implementation, the network adapter 202 includes a port for direct physical connection to the network 105 or to another communication channel. For example, the network adapter 202 includes a USB, SD, CAT-5 or similar port for wired communication with the network 105. In another implementation, the network adapter 202 includes a wireless transceiver for exchanging data with the network 105, or with another communication channel, using one or more wireless communication methods, for example, IEEE 802.11, IEEE 802.16, BLUETOOTH®, near field communication (NFC) or another suitable wireless communication method. In one implementation, the network adapter 202 includes a NFC chip that generates a radio frequency (RF) for short-range communication.

The processor 206 may be any general-purpose processor. The processor 206 includes an arithmetic logic unit, a microprocessor, a general purpose controller or some other processor array to perform computations and execute code and routines. The processor 206 is coupled to the bus 204 for communication with the other components of the computing device 200. Processor 206 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling.

The computing device 200 also includes an operating system executable by the processor including but not limited to WINDOWS®, MacOS X, Android or UNIX® based operating systems. It will be recognized that other processors, operating systems, sensors, displays and physical configurations are possible.

The memory 208 is a non-transitory storage medium. The memory 208 holds instructions and/or data that may be executed by the processor 206. In one implementation, the instructions and/or data stored on the memory 208 include code for performing any and/or all of the techniques described herein. The memory 208 may be a dynamic random access memory (DRAM) device, a static random access memory (SRAM) device, flash memory or some other memory device known in the art. In one implementation, the memory 208 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 208 is coupled by the bus 204 for communication with the other components of the computing device 200. In one implementation, the group accumulator module 220 is stored in memory 208 and executable by the processor 206. In another implementation, one or more of the social networking module 209 (not shown), the completion pattern module 308 (not shown), and the group creation module 310 (not shown) are stored in memory 208 and executable by the processor 206.

In one implementation, the computing device 200 is a user device 115. In one such implementation, the user device contains the group accumulator module 220. Details describing the functionality and components of the group accumulator module 220 are explained in further detail below with regard to FIG. 3.

In one implementation, the computing device 200 is a social network server 101. An implementation of the social network server 101 allows users 125 of user devices 115 to perform social functions between other users 125 of user devices 115 within the system 100. In one implementation, the social network server 101 includes, or is included within, a social network. In one implementation, the social network allows grouping of user 125 within the system 100.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 208 and includes one or more devices including a hard disk drive, a floppy disk drive, a CD-ROM device, a DVD-ROM device, a DVD-RAM device, a DVD-RW device, a flash memory device, or some other mass storage device known in the art. In one implementation, the storage device 214 stores data and information for creating a group based on proximate detection. For example, in one implementation, the computing device 200 is a social network server 101 and the storage device 214 stores the data and information discussed above with regard to data storage 110. In another example, in one implementation, the computing device 200 is a user device and stores a user identifier associated with that user device and group data.

The input device 212 may include a mouse, track ball, or other type of pointing device to input data into the computing device 200. The input device 212 may also include a keyboard, for example, a QWERTY keyboard or any other physical or soft keyboard in any language. The input device 212 may also include a microphone, a web camera or similar audio or video capture device. The graphics adapter 210 displays images and other information on the display 218. The display 218 is a conventional type, for example, a liquid crystal display (LCD) or any other similarly equipped display device, screen, touchscreen or monitor. The display 218 represents any device equipped to display electronic images and data as described herein. The network adapter 202 couples the computing device 200 to one or more of a local or wide area network and other user devices 115.

The group accumulator module 220 may be code and routines executable by the processor 206 for creating a group based on proximate detection. In one implementation, the group accumulator module 220 is a set of instructions executable by the processor 206. In another implementation, the group accumulator module 220 is stored in the memory 208 and is accessible and executable by the processor 206. Details describing the functionality and components of the group accumulator module 220 are explained in further detail below with regard to FIG. 3.

As is known in the art, a computing device 200 can have different and/or other components than those shown in FIG. 2. For example, the computing device 200 can have speakers or another form of audio output. In addition, the computing device 200 can lack certain illustrated components. For example, in one implementation, the computing device 200 is a social network server 101 and lacks an input device 212, graphics adapter 210 and/or display 218. Moreover, the storage device 214 can be local and/or remote from the computing device 200 (e.g., a storage area network (SAN)).

As is known in the art, the computing device 200 is adapted to execute computer program modules for providing the functionality described herein. As used herein, the term "module" refers to computer program logic utilized to provide the specified functionality. Thus, a module can be implemented in hardware, firmware, and/or software. In one implementation, program modules are stored on the storage device 214, loaded into the memory 208 and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
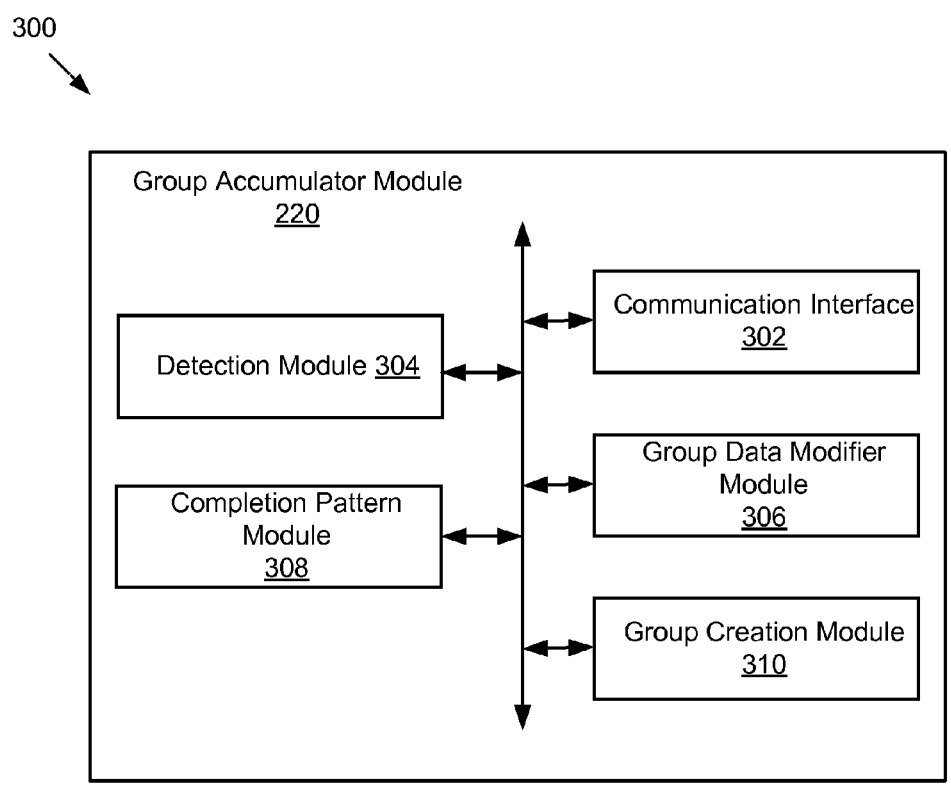
FIG. 3 is a block diagram illustrating an example group accumulator module according to one implementation.

Referring now to FIG. 3, the group accumulator module 220 is shown in more detail according to one implementation. FIG. 3 is a block diagram of the group accumulator module 220 included in a computing device 200 (e.g., a user device 115) according to one implementation.

In one implementation, the group accumulator module 220 includes a communication interface 302, a detection module 304, a group data modifier module 306, a completion pattern module 308 and a group creation module 310.

It will be recognized that the modules 302, 304, 306, 308, 310 included in the group accumulator module 220 are not necessarily all on the same computing device 200. In one implementation, the modules 302, 304, 306, 308, 310 are distributed across multiple computing devices 200. For example, in one implementation, the group creation module 310 is included in the social network server and the other modules 302, 304, 306, 308 are included in a user device 115.

The communication interface 302 may be code and routines for handling communications between the detection module 304, the group data modifier module 306, the completion pattern module 308, the group creation module 310 and other components of the computing device 200. In one implementation, the communication interface 302 is a set of instructions executable by the processor 206. In another implementation, the communication interface 302 is stored in the memory 208 and is accessible and executable by the processor 206. In either implementation, the communication interface 302 is adapted for cooperation and communication with the processor 206, other components of the computing device 200 and other components of the group accumulator module 220.

The communication interface 302 handles communications between the detection module 304, the group data modifier module 306, the completion pattern module 308, the group creation module 310 and other components of the computing device 200. For example, the communication interface 302 communicates with the group data modifier module 306 and the completion pattern module 308 to pass the output of the group data modifier module 306 (i.e., group data) to the completion pattern module 308. In another example, the communication interface 302 communicates with the detection module 304 and the network adapter 202 to send/receive group data to/from another user device 115. However, this description may occasionally omit mention of the communication interface 302 for purposes of clarity and convenience. For example, for purposes of clarity and convenience, the above scenarios may be described as the group data modifier module 306 passing the modified group data to the completion pattern module 308 and the detection module 304 sending/receiving group data to/from a subsequent/preceding user device 115, respectively.

The detection module 304 may be code and routines for detecting a proximate user device 115. In one implementation, the detection module 304 is a set of instructions executable by the processor 206. In another implementation, the detection module 304 is stored in the memory 208 and is accessible and executable by the processor 206. In either implementation, the detection module 304 is adapted for cooperation and communication with the processor 206, other components of the computing device 200 and other components of the group accumulator module 220.

The detection module 304 detects a proximate user device 115 using a proximate detection technique. In one implementation, a proximate detection technique may be based at least in part on one or more wireless communication methods supported by the user device 115, for example, BLUETOOTH®, NFC, etc. For example, assume a current user device and a subsequent user device include a network adapter 202 that supports NFC (i.e. NFC enabled), in one implementation, the detection module 304 of the current device detects that the subsequent device is proximate when a NFC channel is established between the two user devices. In another example, assume a current user device and a subsequent user device are BLUETOOTH® enabled devices, in one implementation, the detection module 304 of the current device detects that the subsequent device is proximate when the subsequent device is within range to establish a BLUETOOTH® communication channel.

In some implementations, the range of the proximate detection technique may be short. For example, in an exemplary implementation, the proximate detection technique uses NFC and the range may be a couple inches or less. Implementations with shorter range proximate detection technique may beneficially reduce the chances that the user of the current device does not intend to include the user of the subsequent device in the group. For example, the chances of multiple devices being in range are reduced, and/or the devices must almost touch in order to be proximate, which may be less likely to occur without user intent. In one implementation, when multiple devices are detected as proximate, the detection module 304 receives user input selecting one or more devices to send/receive group data to/from.

In one implementation, responsive to the detection of a proximate user device 115 by the detection module 304, the detection module 304 sends or receives group data. For example, assume a current device and a subsequent device are proximate to one another, in one implementation, the current device responsive to the detection module 304 detecting that the subsequent device is proximate sends group data to the subsequent device, and the subsequent device responsive to the detection module 304 detecting that the current device is proximate receives the group data from the current device.

In one implementation, the detection module 304 sends/receives group data via the same communication method used by the detection module 304 to detect a proximate device. For example, assume the detection module 304 of both the current device and subsequent device use NFC to determine when the devices are proximate to one another, in one implementation, the detection module 304 of the current device sends group data to the subsequent device using an NFC channel. In another implementation, the detection module 304 sends/receives group data via a communication method different from the communication method used by the detection module 304 to detect a proximate device. For example, assume the detection module 304 of both the current device and subsequent device use NFC to determine when the devices are proximate to one another, in one implementation, the detection module 304 of the current device sends group data to the subsequent device using an IEEE 802.11, IEEE 802.16 or BLUETOOTH® channel.

In one implementation, the user device 115 retains a copy of the group data sent to a subsequent device. In another implementation, the user device 115 does not retain a copy of the group data once the group data is sent to a subsequent user device. For example, in one implementation, the detection module 304 deletes the group data from the user device's storage device 214 (or any other non-transitory storage medium of the device) after the group data is sent to the subsequent device and the subsequent device confirms receipt of the group data.

In one implementation, the detection module 304 receives user input. For example, in one implementation, the detection module 304 receives user input providing consent to send the group data to a subsequent device. In another example, assume the current device includes multiple sets of group data, in one implementation, the detection module 304 receives user input selecting which group data to send to the subsequent device.

In one implementation, the detection module 304 passes group data to a subsequent user device 115. For example, the detection module 304 is communicatively coupled to the subsequent user device 115 to send the group data to the subsequent user device 115. In another implementation, the detection module 304 (or the communication interface 302) stores the group data in the storage device 214 (or any other non-transitory storage medium communicatively accessible). The other modules of the group accumulator module 220, for example, the communication interface 302, can retrieve the group data by accessing the storage device 214 (or other non-transitory storage medium).

In one implementation, the detection module 304 receives group data from a preceding user device 115. For example, the detection module 304 is communicatively coupled to the preceding user device 115 to receive the group data from the preceding user device 115. In another implementation, the detection module 304 (or the communication interface 302) stores the group data in the storage device 214 (or any other non-transitory storage medium communicatively accessible). The other modules of the group accumulator module 220, for example, the group data modifier module 306, can retrieve the group data by accessing the storage device 214 (or other non-transitory storage medium).

The group data modifier module 306 may be code and routines for modifying group data. In one implementation, the group data modifier module 306 is a set of instructions executable by the processor 206. In another implementation, the group data modifier module 306 is stored in the memory 208 and is accessible and executable by the processor 206. In either implementation, the group data modifier module 306 is adapted for cooperation and communication with the processor 206, other components of the computing device 200 and other components of the group accumulator module 220.

The group data modifier module 306 modifies group data. In one implementation, modifying group data includes one or more of creating group data and modifying existing group data. Group data may include one or more user identifiers. In one implementation, the user identifier identifies the user associated with the user identifier or a social network profile associated with the user associated with the user identifier. Examples of user identifiers include, but are not limited to, name, government issued identification number, user name, alias, e-mail address, phone number, user device number, social network account number, social network user number or any other information that may identify the associated user or a social network profile associated with that user.

In one implementation, the group data modifier module 306 of a user device 115 modifies group data to include a user identifier associated with the user 125 of that user device 115. For example, assume a mobile phone belonging to Becky receives group data from a mobile phone belonging to Alice, in one implementation, the group data modifier module 306 of Becky's mobile phone modifies the existing group data to include a user identifier associated with Becky. In other words, in one implementation, the group data modifier module 306 of the subsequent device (i.e. Becky's mobile phone) modifies the existing group data to include a user identifier where the subsequent device is associated with a subsequent user (i.e. Becky), and the user identifier is associated with the subsequent user.

In one implementation, the existing group data modified by the group data modifier module 306 includes the user identifiers of users associated with any preceding devices. A user identifier of a user associated with a preceding device is occasionally referred to herein as a "previous user identifier." For example, assume that Alice is the user that initiated the creation of the group, occasionally referred to herein as the "group creator," in one implementation, the group data modifier module 306 of Alice's mobile phone modifies the group data by creating group data that includes the user identifier associated with Alice prior to that group data being sent to Becky's mobile phone. Since there were not preceding devices, no users associated with preceding devices existed and there was no existing group data, so the group data modifier module 306 creates group data including Alice's user identifier. In another example, still assuming that Alice is the group creator, the group data received by Becky and modified by the group data modifier module 306 of Becky's mobile phone includes existing group data that includes Alice's user identifier (i.e. a user identifier associated with a user of any preceding devices).

In one implementation, group data may include other information in addition to one or more user identifiers. Examples of other information include, but are not limited to, one or more of a group identifier, a time stamp, etc. In one implementation, group data modifier module 306 modifies the group data to include a group identifier. For example, in one implementation, the group data modifier module 306 modifies the group data to include a group identification string received from the group creator. In one implementation, group data modifier module 306 modifies the group data to include a time stamp. For example, in one implementation, the group data modifier module 306 of Alice's mobile phone modifies the group data to include a time stamp indicating when Alice's user identifier was added to the group data (i.e. when the group was created), and the group data modifier module 306 of Becky's mobile phone modifies the group data to include a time stamp indicating when Becky's user identifier was added to the group data. Depending on the implementation, the time stamp included may be associated with one or more of when the group data was created, when each user identifier was added to the group data, when the most recent user identifier was added to the group data, etc.

In one implementation, the group data modified by the group data modifier module 306 includes a format, for example, an ordered list or queue. In one implementation, the group data has an ordered list format. For example, the ordered list is generated by the group data modifier module 306 of each device appending the user identifier of the user associated with that device to the list such that the user identifier associated with the group creator is at a first end of the list and the user identifier associated with the most recent recipient of the group data is at a second end of the list.

In one implementation, the group data modifier module 306 passes the group data to the completion pattern module 308. For example, the group data modifier module 306 is communicatively coupled to the completion pattern module 308 to send the group data to the completion pattern module 308. In another implementation, the group data modifier module 306 (or the communication interface 302) stores the group data in the storage device 214 (or any other non-transitory storage medium communicatively accessible). The other modules of the group accumulator module 220, for example, the completion pattern module 308, can retrieve the group data by accessing the storage device 214 (or other non-transitory storage medium).

The completion pattern module 308 may be code and routines for determining whether a completion pattern exists. In one implementation, the completion pattern module 308 is a set of instructions executable by the processor 206. In another implementation, the completion pattern module 308 is stored in the memory 208 and is accessible and executable by the processor 206. In either implementation, the completion pattern module 308 is adapted for cooperation and communication with the processor 206, other components of the computing device 200 and other components of the group accumulator module 220.

The completion pattern module 308 determines when a completion pattern exists. Examples of a completion pattern include, but are not limited to one or more of a loop and an incomplete loop. Examples of a loop and incomplete loop are discussed below with regard to FIG. 6. In one implementation, the completion pattern module 308 determines when a completion pattern exists based at least in part on the group data. For example, the completion pattern module 308 determines when a completion pattern exists based at least in part on one or more of a user identifier, the format of the group data and the other information in the group data (e.g. a time stamp).

In one implementation, the completion pattern module 308 determines whether a completion pattern exists based at least in part on a user identifier. For example, assume the completion pattern is a loop, in one implementation, the completion pattern module 308 determines a completion pattern exists when the user identifier associated with the user of the current device matches the user identifier associated with the group creator.

In one implementation, the completion pattern module 308 determines whether a completion pattern exists based at least in part on the format of the group data. For example, assume the group data has a format including an ordered list of user identifiers. Assume also that the order is related to the order in which the user identifiers were added to the group data so that the user identifier first/last in the ordered list is associated with the group creator, and the user identifier last/first in the ordered list is the user identifier of the use associated with the current device. In one implementation, the completion pattern module 308 determines that a completion pattern exists when the user identifiers in the first position and last position of the ordered list are match. In other words, in one implementation, the completion pattern module 308 determines completion pattern exists when the user identifier at the first end of the ordered list and the second end of the ordered list are identical.

In one implementation, the completion pattern module 308 determines whether a completion pattern exists based at least in part on the other information in the group data. In one implementation, the completion pattern module 308 determines whether a completion pattern exists based at least in part on a time stamp. For example, assume the completion pattern module 308 determines that a loop completion pattern does not exist; in one implementation, the completion pattern module 308 determines whether an incomplete loop completion pattern exists. In one implementation, an incomplete loop completion pattern may be based at least in part on a time-out. For example, when a loop completion pattern does not exist within a certain time period after the group creator initiated the creation of the group or when the current device has not detected a subsequent device in a predetermined period of time after receiving the group data, in one implementation, the completion pattern module 308 determines that the group data timed-out and an incomplete loop completion pattern exists. In another implementation, when the group data times out, the completion pattern module 308 determines that no completion pattern exists and deletes the group data, thus no group is created.

In one implementation, the completion pattern module 308 determines whether a completion pattern exists based at least in part on user input. For example, one or more of the user of the current device and the group creator may request to force group creation. Responsive to receiving the request, the completion pattern module 308 determines that a completion pattern exists.

In one implementation, responsive to the completion pattern module 308 determining that a completion pattern does not exist, the completion pattern module 308 passes the group data to the detection module 304 for sending to a subsequent device when the subsequent device is proximate. For example, the completion pattern module 308 is communicatively coupled to the detection module 304 to send the group data to the detection module 304. In another implementation, the completion pattern module 308 (or the communication interface 302) stores the group data in the storage device 214 (or any other non-transitory storage medium communicatively accessible). The other modules of the group accumulator module 220, for example, the detection module 304, can retrieve the group data by accessing the storage device 214 (or other non-transitory storage medium).

In one implementation, responsive to the completion pattern module 308 determining that a completion pattern exists, the completion pattern module 308 passes the group data to the group creation module 310. For example, the completion pattern module 308 is communicatively coupled to the completion pattern module 308 to send the group data to the completion pattern module 308. In another implementation, the completion pattern module 308 (or the communication interface 302) stores the group data in the storage device 214 (or any other non-transitory storage medium communicatively accessible). The other modules of the group accumulator module 220, for example, the group creation module 310, can retrieve the group data by accessing the storage device 214 (or other non-transitory storage medium).

The group creation module 310 may be code and routines for creating an online, social networking group. In one implementation, the group creation module 310 is a set of instructions executable by the processor 206. In another implementation, the group creation module 310 is stored in the memory 208 and is accessible and executable by the processor 206. In either implementation, the group creation module 310 is adapted for cooperation and communication with the processor 206, other components of the computing device 200 and other components of the group accumulator module 220.

The group creation module 310 creates an online, social networking group. In one implementation, the online, social networking group created by the group creation module 310 includes the users associated with the user identifiers of the group data. For example, assume the group data included user identifiers associated with Alice, Becky and Chris or their social networking profiles, in one implementation, the group creation module 310 creates an online, social networking group including Alice, Becky and Chris.

In one implementation, the group creation module 310 resides in the social network server 101 and is operable thereon. For example, the group creation module 310 of the social network server 101 receives the group data from a user device responsive to the completion pattern module 308 of that user device determining the existence of a completion pattern and creates a social networking group within the social network associated with that social network server 101.

In another implementation, the group creation module 310 resides in a user device 115 and is operable thereon. For example, the croup creation module 310 receives the group data from a user device 115 responsive to the completion pattern module 308 of that user device 115 determining the existence of a completion pattern and creates a social networking group within a social network associated with the user identifiers of the group data.

In one implementation, the creation of the group by the group creation module 310 is automatic. In one implementation, the group creation module 310 automatically creates the group without further input by a user. For example, in one implementation, the group creation module 310 creates the group and includes the users associated with the group data responsive to the detection of a completion pattern. In another implementation, the group creation module 310 creates the group subject to user input. For example, in one implementation, the group creation module 310 creates the group and includes the users associated with the group data responsive to the detection of a completion pattern subject to the group creator logging into the social network. In another example, in one implementation, the group creation module 310 creates the group by automatically populating one or more fields for the creation of a group. For example, assume a social network provides a group creation webpage with fields for a user to enter a group name and identify users to be included in the group, in one implementation, the group creation module 310 creates the group by navigating to that group creation webpage, populating the group name field and the users to be included in the group based on the group data, and the user may review and edit the fields before selecting to create that group.

In one implementation, creating the group includes modifying a pre-existing group. For example, assume the group data includes a group identifier "Finance Committee" and user identifiers associated with Alice (group creator), Becky and Dan. Assume also that Alice's social network profile is already associated with an online, social networking group "Finance Committee," which includes Alice, Becky and Chris, in one implementation, the group creation module 310 modifies the pre-existing "Finance Committee" group to include the plurality of users associated with user identifiers of the group data. For example, Dan is added to the "Finance Committee" group since Alice and Becky were already part of the group.

Figure 4:
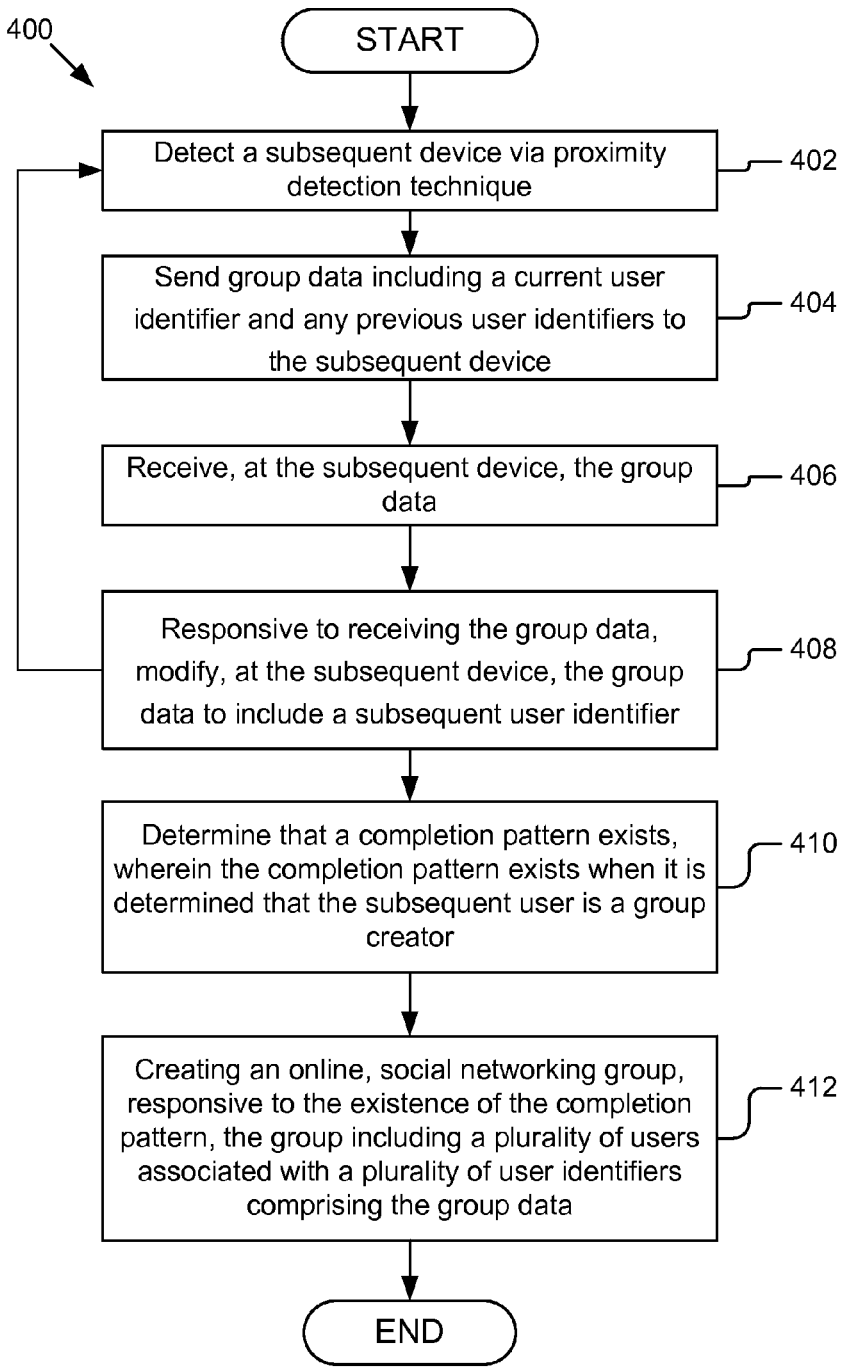
FIG. 4 is a flow chart illustrating an example method for creating a group based on proximate detection according to one implementation.
Figure 5:
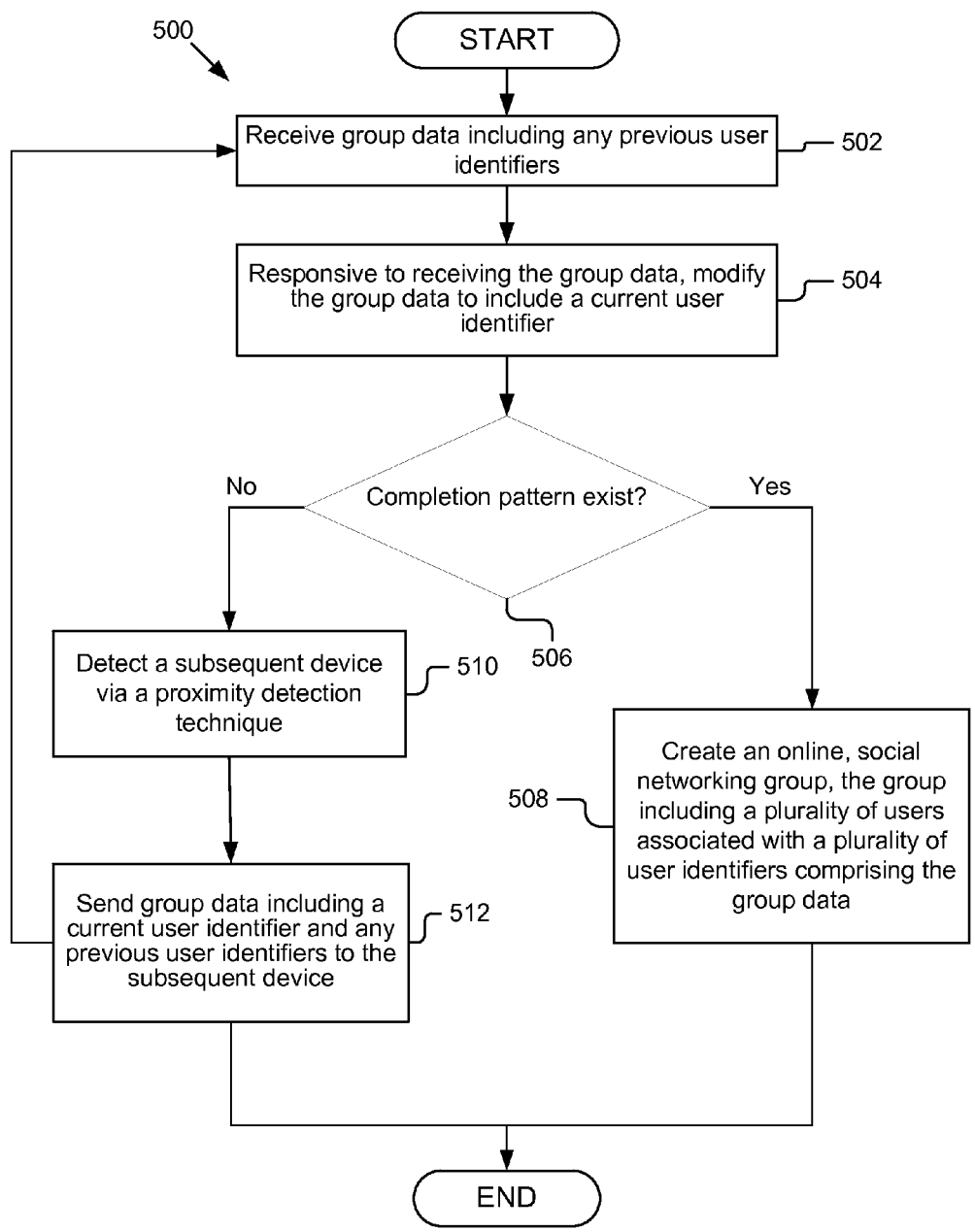
FIG. 5 is a flow chart illustrating another example method for creating a group based on proximate detection according to one implementation.

FIGS. 4 and 5 depict various methods 400, 500 performed by the system described above with regard to FIGS. 1-3.

FIG. 4 is a flow chart illustrating an example method 400 for creating a group based on proximate detection according to one implementation. At block 402, the detection module 304 of the group accumulator module 220 of a current device detects a subsequent device via a proximity detection technique. At block 404, the detection module 304 of the first device sends group data including a current user identifier and any previous user identifiers to the subsequent device. At block 406, the group data modifier module 306 of the subsequent device receives the group data sent at step 404. At block 408, the group data modifier module 306 of the subsequent device modifies the group data to include a subsequent user identifier. The subsequent user identifier associated with the user of the subsequent device. Blocks 402-408 are repeated until a completion pattern is detected. At block, 410 a completion pattern module 308 determines that a completion pattern exists when the completion pattern module 308 determines that the subsequent user is a group creator. At block 412, the group creation module 310 creates an online, social networking group responsive to the existence of the completion pattern and the method 400 ends. The group includes the plurality of users associated with the plurality of user identifiers of the group data.

FIG. 5 is a flow chart illustrating another example method 500 for creating a group based on proximate detection according to one implementation. At block 502, the group data modifier module 306 of the group accumulator module 220 receives group data including any previous user identifiers. At block 504, responsive to receiving the group data, the group data modifier module 306 modifies the group data to include a current user identifier. At block 506, the completion pattern module 308 determines whether a completion pattern exists. If the completion pattern module 308 determines that a completion does not exist (608—No), at block 510, the detection module 304 detects a subsequent device via a proximity detection technique sends, at block 512, the group data including a current user identifier and any user identifiers to the subsequent device. The method 500 then continues when the subsequent device receives the group data sent at block 512. Blocks 502, 504, 506, 510 and 512 are repeated by various devices until the completion pattern module 308 determines that a completion pattern exists at step 506. If the completion pattern module 308 determines that a completion pattern exists (506—Yes), the group creation module 310 creates an online, social networking group responsive to the existence of the completion pattern and the method 500 ends. The group includes the plurality of users associated with the plurality of user identifiers of the group data.

Figure 6A:
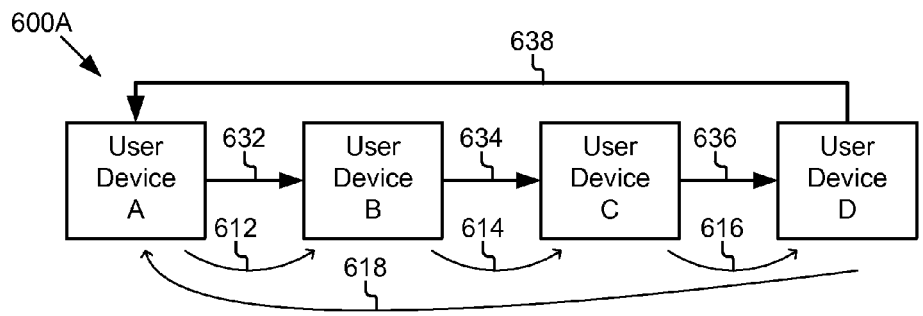
FIGS. 6A-C are block diagrams illustrating examples of completion patterns according to one or more implementations.
Figure 6B:
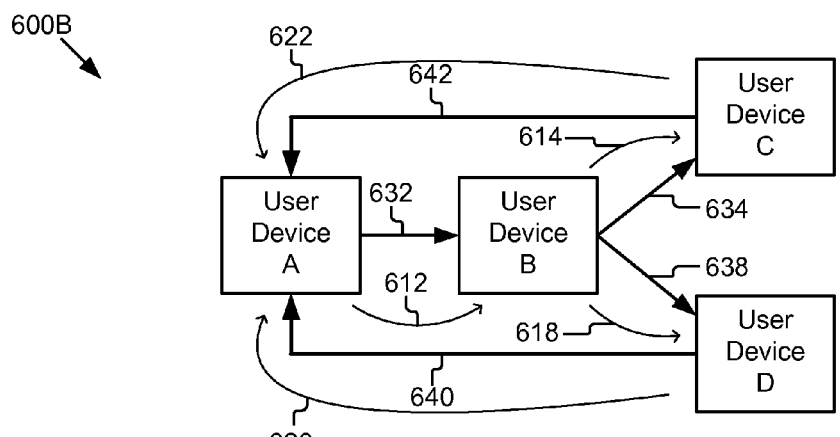
Figure 6C:
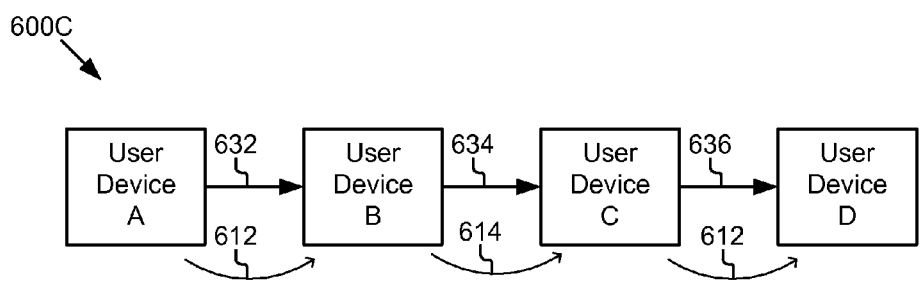

Referring to FIGS. 6A-C, block diagrams of examples of completion patterns according to one or more implementations are illustrated.

In one implementation, the completion pattern module 308 determines when a loop completion pattern exists. FIG. 6A illustrates an example of a loop completion pattern 600A according to one implementation. In FIG. 6A, assume user device A belongs to the group creator—User A. User device A's group data modifier 306 creates group data including User A identifier—the user identifier associated with the group creator User A. User device A is placed proximate to user device B as represented by line 612. The detection module 304 of user device A detects user device B and the group data is sent by user device A and received by user device B, which is represented by line 632. User device B's group data modifier 306 modifies the group data to include a User B identifier—the user identifier associated with the user associated with user device B. User device B's completion pattern module 308 determines no completion pattern exists. User device B is placed proximate to user device C as represented by line 614. The detection module 304 of user device B detects user device C and the group data is sent by user device B and received by user device C, which is represented by line 634. User device C's group data modifier 306 modifies the group data to include a User C identifier—the user identifier associated with the user associated with user device C. User device C's completion pattern module 308 determines no completion pattern exists. User device C is placed proximate to user device D as represented by line 616. The detection module 304 of user device C detects user device D and the group data is sent by user device C and received by user device D, which is represented by line 636. User device D's group data modifier 306 modifies the group data to include a User D identifier—the user identifier associated with the user associated with user device D. User device D's completion pattern module 308 determines no completion pattern exists. User device D is placed proximate to user device A as represented by line 618. The detection module 304 of user device D detects user device A and the group data is sent by user device D and received by user device A, which is represented by line 638.

In one implementation, user device A's completion pattern module 308 determines that a loop completion pattern exists upon receipt of the group data from user device D. For example, in one implementation, the completion pattern module 308 determines that user identifier associated with the group creator in the group data is identical to the user identifier associated with the current device. In another implementation, user device A's group data modifier 306 modifies the group data to include another instance of the User A identifier, and the completion pattern module 308 determines that a loop completion pattern exists subsequent to the modification. For example, in one implementation, the group data modifier 306 modifies the group data by appending the user identifier associated with the user of the current device to the end of the ordered list of user identifiers and the completion pattern module 308 determines that the user identifier on both ends of the ordered list of user identifiers are identical. Regardless of the implementation, the group creation module 310 creates an online, social networking group responsive to the detection of the completion pattern.

In one implementation, a loop may be branched. FIG. 6B illustrates another example of a loop completion pattern 600B according to one implementation of a branched loop. Similar to FIG. 6A, in FIG. 6B, assume user device A belongs to the group creator—User A. User device A's group data modifier 306 creates group data including User A identifier—the user identifier associated with the group creator User A. User device A is placed proximate to user device B as represented by line 612. The detection module 304 of user device A detects user device B and the group data is sent by user device A and received by user device B, which is represented by line 632. User device B's group data modifier 306 modifies the group data to include a User B identifier—the user identifier associated with the user associated with user device B. User device B's completion pattern module 308 determines no completion pattern exists. User device B is placed proximate to user device C as represented by line 614. The detection module 304 of user device B detects user device C and the group data is sent by user device B and received by user device C, which is represented by line 634. User device C's group data modifier 306 modifies the group data to include a User C identifier— the user identifier associated with the user associated with user device C. User device C's completion pattern module 308 determines no completion pattern exists. User device C is placed proximate to user device A as represented by line 622. The detection module 304 of user device C detects user device A and the group data is sent by user device C and received by user device A, which is represented by line 638.

As described above with regard to FIG. 6A, user device A's completion pattern module 308 determines that a first loop completion pattern exists. The group creation module 310 creates an online, social networking group responsive to the detection of the completion pattern the online, social networking group including users A, B and C.

In one implementation, a user device may retain a copy of the group data after sending the group data to a subsequent device. For example, the user device B retains a copy of the group data sent to user device C. User device B is then placed proximate to user device D as represented by line 618. The detection module 304 of user device B detects user device D and the group data is sent by user device B and received by user device D, which is represented by line 638. User device D's group data modifier 306 modifies the group data to include a User D identifier—the user identifier associated with the user associated with user device D. User device D's completion pattern module 308 determines no completion pattern exists.

User device D is placed proximate to user device A as represented by line 620. The detection module 304 of user device D detects user device A and the group data is sent by user device D and received by user device A, which is represented by line 640.

As described above with regard to FIG. 6A, user device A's completion pattern module 308 determines that a loop completion pattern exists upon receipt of the group data from user device D. The group creation module 310 creates an online, social networking group responsive to the detection of the completion pattern. In one implementation, the group creation module 310 creates a different online, social networking group responsive to the detection of the completion pattern including users A, B and D. In another implementation, the group creation module 310 modifies the existing online, social networking group (which includes users A, B and C) to also include user D.

In one implementation, the completion pattern module 308 determines when an incomplete loop completion pattern exists. FIG. 6C illustrates an example of an incomplete loop completion pattern 600C according to one implementation. Similar to FIG. 6A, in FIG. 6C, assume user device A belongs to the group creator—User A. User device A's group data modifier 306 creates group data including User A identifier—the user identifier associated with the group creator User A. User device A is placed proximate to user device B as represented by line 612. The detection module 304 of user device A detects user device B and the group data is sent by user device A and received by user device B, which is represented by line 632. User device B's group data modifier 306 modifies the group data to include a User B identifier—the user identifier associated with the user associated with user device B. User device B's completion pattern module 308 determines no completion pattern exists. User device B is placed proximate to user device C as represented by line 614. The detection module 304 of user device B detects user device C and the group data is sent by user device B and received by user device C, which is represented by line 634. User device C's group data modifier 306 modifies the group data to include a User C identifier—the user identifier associated with the user associated with user device C. User device C's completion pattern module 308 determines no completion pattern exists. User device C is placed proximate to user device D as represented by line 616. The detection module 304 of user device C detects user device D and the group data is sent by user device C and received by user device D, which is represented by line 636. User device D's group data modifier 306 modifies the group data to include a User D identifier—the user identifier associated with the user associated with user device D.

Since user device D is not associated with the group creator, user device D's completion pattern module 308 determines no loop completion pattern exists. However, in one implementation, the group data on user device D times-out. For example, depending on the implementation, the group data times-out if the group data is not sent to a subsequent user device within a predetermined time period after being received by user device D and/or if the group data is not received by user device A thus completing a loop completion pattern within a predetermined period of time. In one implementation, when the group data times-out, the completion pattern module 308 determines an incomplete loop completion pattern exists. In one such implementation, the group creation module 310 creates an online, social networking group responsive to the detection of the incomplete loop completion pattern including users A, B, C and D. In another implementation, when the group data times-out, the completion pattern module 308 determines no completion pattern exists and the group data is deleted. It will be recognized that the preceding are merely examples of a loop, branched loop and an incomplete loop and that other example exist. For example, a branched loop may have multiple branches and one or more of the branches may be an incomplete loop.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The foregoing description of the implementations has been presented for the purposes of illustration and description. It is not intended to be exhaustive or to limit the present implementations to the precise forms disclosed. Many modifications and variations are possible in light of the above teaching. It is intended that the scope of the present implementations be limited not by this detailed description, but rather by the claims of this application. As will be understood by those familiar with the art, the present implementations may take other specific forms without departing from the spirit or essential characteristics thereof. Likewise, the particular naming and division of the modules, routines, features, attributes, methodologies and other aspects are not mandatory or significant, and the mechanisms that implement one implementation or its features may have different names, divisions and/or formats. Furthermore, as will be apparent, the modules, routines, features, attributes, methodologies and other aspects of the implementations can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the implementations are in no way limited to implementation in any specific programming language, or for any specific operating system or environment. Accordingly, the disclosure is intended to be illustrative, but not limiting, of the scope, which is set forth in the following claims.

What is claimed is:

1. A computer-implemented method comprising:
   detecting, by a first device, a second device via a proximity detection technique, the first device associated with a first user, the second device associated with a second user;
   sending, by the first device, group data including a first user identifier to the second device, the first user identifier associated with the first user, the group data including an ordered list of user identifiers having a beginning and an end;
   receiving, by the second device, the group data;
   responsive to receiving the group data, modifying, by the second device, the group data to include a second user identifier, the second user identifier associated with the second user by appending the second user identifier to the end of the ordered list;
   determining that a completion pattern exists, wherein the completion pattern exists when it is determined that a user identifier at the beginning of the ordered list and a user identifier at the end of the ordered list are the same; and creating an online social networking group responsive to existence of the completion pattern, the online social networking group including a plurality of users associated with the user identifiers in the group data.

2. The method of claim 1, wherein the ordered list is generated by each device appending a user identifier of a user associated with that device to the ordered list, a user identifier associated with a group creator being at the beginning of the ordered list and the user identifier associated with a most recent recipient of the group data being at the end of the ordered list.

3. The method of claim 1, wherein creating the online social networking group further comprises:
sending the group data to a social networking server, the social networking server associated with an online social networking service; and
creating, at the social networking server, the online social networking group, the online social networking group including the plurality of users associated with the user identifiers in the group data.

4. The method of claim 1, wherein the second device determines whether the completion pattern exists.

5. The method of claim 1, wherein creating the online social networking group modifies a pre-existing group by including the plurality of users associated with the user identifiers to the pre-existing group.

6. The method of claim 1, wherein the proximity detection technique includes near field communication.

7. The method of claim 1, wherein sending the group data uses near field communication.

8. A computer program product comprising a non-transitory computer useable medium including a computer readable program, wherein the computer readable program when executed on a computer causes the computer to:
receive group data from a preceding device, the group data including an ordered list of user identifiers having a beginning and an end;
responsive to receiving the group data, modify the group data to include a first user identifier by appending the first user identifier to the end of the ordered list, the first user identifier associated with the first user;
determine whether a completion pattern exists, wherein the completion pattern exists when it is determined that a user identifier at the beginning of the ordered list and a user identifier at the end of the ordered list are the same;
responsive to existence of the completion pattern, create an online social networking group, the online social networking group including a plurality of users associated with the user identifiers in the group data;
when no completion pattern exists, detect a second device via a proximity detection technique, the second device associated with a second user; and
send group data including the first user identifier to the second device.

9. The computer program product of claim 8, wherein the ordered list is generated by each device appending a user identifier of a user associated with that device to the ordered list, a user identifier associated with a group creator being at the beginning of the ordered list and the user identifier associated with a most recent recipient of the group data being at the end of the ordered list.

10. The computer program product of claim 8, wherein creating the online social networking group further causes the computer to:
send the group data to a social networking server, the social networking server associated with an online social networking service, the social network server creating the online social networking group, the online social networking group including the plurality of users associated with the user identifiers in the group data.

11. The computer program product of claim 8, wherein the second device determines whether the completion pattern exists.

12. The computer program product of claim 8, wherein creating the online social networking group modifies a pre-existing group by including the plurality of users associated with the user identifiers to the pre-existing group.

13. The computer program product of claim 8, wherein the proximity detection technique includes near field communication.

14. The computer program product of claim 8, wherein sending the group data uses near field communication.

15. A system comprising:
a first device operable to detect a second device via a proximity detection technique, the first device associated with a first user and the first device operable to send group data including a first user identifier to the second device, the group data including an ordered list of user identifiers having a beginning and an end, the first user identifier associated with the first user, the first device also operable to modify the group data to include the first user identifier;
the second device operable to receive the group data, the second device associated with a second user, and responsive to receiving the group data, modify the group data to include a second user identifier, the second user identifier associated with the second user, the second device communicatively coupled to the first device to receive the group data;
a completion determination module operable to determine that a completion pattern exists, wherein the completion pattern exists when the completion determination module determines that a user identifier at the beginning of the ordered list and a user identifier at the end of the ordered list are the same; and
a group creation module operable to create an online social networking group responsive to existence of the completion pattern, the online social networking group including a plurality of users associated with user identifiers in the group data, the group creation module communicatively coupled to receive the existence of a completion pattern from the completion determination module.

16. The system of claim 15, wherein the ordered list is generated by each device appending a user identifier of a user associated with that device to the ordered list, a user identifier associated with a group creator being at the beginning of the ordered list and a user identifier associated with a most recent recipient of the group data being at an end of the ordered list.

17. The system of claim 15, wherein the system further comprises:
a social networking server operable to create the online social networking group, the online social networking group including the plurality of users associated with the user identifiers in the group data, the social network server associated with an online social networking service and communicatively coupled to receive the group data; and wherein creating the social networking group includes sending the group data to the social networking server.

18. The system of claim 15, wherein the second device includes the completion determination module and determines whether the completion pattern exists.

19. The system of claim 15, wherein creating the online social networking group modifies a pre-existing group by including the plurality of users associated with the user identifiers to the pre-existing group.

20. The system of claim 15, wherein the first device and second device are able to perform near field communication and one or more of the proximity detection technique and the sending of the group data uses near field communication.

* * * * *